(12) United States Patent
Spirin et al.

(10) Patent No.: US 6,753,520 B2
(45) Date of Patent: Jun. 22, 2004

(54) FIBER OPTIC SENSOR WITH TRANSMISSION/REFLECTION ANALYZER

(75) Inventors: Vasilii V. Spirin, Ensenada (MX);
Mikhail G. Shlyagin, Ensenada (MX);
Serguei V. Miridonov, Ensenada (MX);
Francisco J. Mendieta Jiménez,
Ensenada (MX); **Alfredo Márquez
Lucero**, Edo. de Mexico (MX)

(73) Assignees: Centro de Investigacion Cientifica y de Educacion Superior de Ensenada (CICESE) (MX); Centro de Investigacion en Materiales Avanzados, S.C. (MX)

( * ) Notice: Subject to any disclaimer, the term of this patent is extended or adjusted under 35 U.S.C. 154(b) by 179 days.

(21) Appl. No.: 09/954,496

(22) Filed: Sep. 17, 2001

(65) Prior Publication Data

US 2003/0052256 A1 Mar. 20, 2003

(51) Int. Cl.[7] .............................. G01J 1/04; G01J 1/42; G01J 5/08
(52) U.S. Cl. .............................. 250/227.16; 250/227.11; 385/13; 73/800
(58) Field of Search .......... 250/227.11, 227.14–227.19, 250/227.27, 227.28; 385/10, 12, 13, 37; 356/73.1, 32–35, 35.5; 374/161; 73/800

(56) References Cited

U.S. PATENT DOCUMENTS

| | | | | |
|---|---|---|---|---|
| 5,015,843 A | * | 5/1991 | Seitz et al. ............ | 250/227.21 |
| 5,202,746 A | * | 4/1993 | Sentsui et al. ............ | 356/73.1 |
| 5,493,113 A | * | 2/1996 | Dunphy et al. ......... | 250/227.19 |
| 5,500,730 A | * | 3/1996 | Johnson ..................... | 356/73.1 |
| 6,285,806 B1 | * | 9/2001 | Kersey et al. ............... | 385/12 |

* cited by examiner

*Primary Examiner*—Thanh X. Luu
*Assistant Examiner*—Stephen Yam
(74) *Attorney, Agent, or Firm*—Pendorf & Cutliff (57) ABSTRACT

Fiber optic sensor with transmission/reflection analyzer for detection and localization of a perturbation that generates additional losses in the test fiber. The sensor includes a test fiber having a first port and a second port; a light source for producing a beam of light propagating along the test fiber; a fiber optic beamsplitter having a first port connected to the light source, a second port connected to the first port of the test fiber, and a third and a fourth port; a plurality of reflectors positioned along the test fiber and a plurality of loss-inducing members positioned along the test fiber, wherein said each of the reflectors is matched to each loss-inducing members, wherein at least one reflector is placed between each consecutive loss-inducing member; an optical reflection detector to receive a light flux, the optical reflection detector connected to the third port of optic beamsplitter, wherein the reflection detector is adapted to sense changes in the power of the light reflected from the reflectors; an optical transmission detector adapted to receive the light flux, connected to the second port of test fiber, said transmission detector being operable to sense changes in the power of the light transmitted through the test fiber; and a transmission/reflection analyzer connected to reflection and transmission detectors, said analyzer adapted to measure the value and identify the location of the disturbance along the test fiber by using a unique relation between transmitted and reflected powers for different locations of the disturbance along the test fiber.

14 Claims, 5 Drawing Sheets

FIBER OPTIC SENSOR WITH TRANSMISSION/REFLECTION ANALYZER

BACKGROUND OF THE INVENTION

1. Field of the Invention

The present invention pertains to optical fiber sensors for detection and localization of perturbation acting upon a structure. More specifically, this invention has reference to distributed optical fiber sensors where an external perturbation such as temperature, pressure, displacement, etc introduces additional losses in the sensing fiber. Particularly, this invention relates to an optical fiber sensor suitable to be used as a leakage detector in an industrial system for the chemical and petrochemical industries that provides measurement of the value and position of the perturbation.

2. Description of the Related Art

Sensors that can detect the presence or absence of a selected substance ("analyte") are widely used in many different fields. For example, environmental sensors are used to detect pollutants and have become increasingly important, as environmental standards have become stricter. Medicine is another field where the use of sensors is growing, especially in the area of medical diagnostics. Further, sensors also control various industrial processes.

The prior art sensors for the detection of analytes generally rely on small changes in the indices of refraction in response to the presence of an analyte. Commonly used optical sensors include planar waveguides, optical fibers and diffraction gratings. Optical fiber sensors for sensing the presence of a particular fluid substance such as water vapor, water, petrochemicals, hydrocarbon fuels, etc., are well known in the prior art.

The prior art includes many attempts to provide reliable detection of leaks of the contents of tanks, pipelines, and the like. Detection of leaks in a simple, efficient and reliable fashion is highly desired at present because of increased public awareness of the sensitivity of the environment to chemical spills and the like. Moreover, increasing regulatory activity mandates reduction of industrial leakage of toxic chemicals and the like, and detection and cure of such leaks before their effects can become dangerous or catastrophic.

Hydrocarbon leak detecting devices often have been constructed in a manner, which requires their replacement, or repair upon detection of a leak, that is, once contacted by a hydrocarbon fuel, the detection device, or its key components, must be replaced before the detector can be used again. Another problem is that in most storage tanks or pipelines, there will be considerable ground water present, and any detector must be capable of distinguishing between ground water and hydrocarbons and capable of functioning without being overwhelmed by ground water in order to avoid false detection signals.

U.S. Pat. No. 5,378,889 to Lawrence entitled "Method and Apparatus for Detecting Hydrocarbon Fuels in a Vapor State with an Absorber-Expander Member" discloses a fiber optic sensor for the detection of hydrocarbon fuels. This type of prior art fiber optic sensor, however, is not optimal. The fiber optic sensor is inaccurate and limited in the distance over which it may be used.

U.S. Pat. No. 4,590,462 to Moorehead entitled "Oil leakage detection apparatus" employs microbending of an optical fiber in a detection unit to detect hydrocarbon fuels. A rotary actuator is mechanically coupled to an optical fiber to produce microbending of the fiber. The rotary actuator includes a spring mechanism having stored energy, which is released upon degradation of shear pins under the action of hydrocarbons. Thus, when the hydrocarbon analyte is present in sufficient quantity to degrade the shear pins, the spring is released, and the optical fiber displaced to produce a microbend that can be sensed by optical time domain reflectometry. This approach, however, clearly is not reversible since it depends upon destruction of the shear pins upon contact with the hydrocarbon.

The prior art further shows a method for detecting the leak of an analyte by using a fiber optic sensor in conjunction with a substance that swells and mechanically creates a perturbation in, or particularly, a microbending in the optical fiber. The condition can then be readily detected by the attenuation in the signal transmitted by the fiber or by optical time domain reflectometer (OTDR). For example, U.S. Pat. No. 5,138,153 to Gergely et al. entitled "Distributed Fiber-Optic Sensor with Substance Selective Permeable Coating" discloses a fiber optic sensor based upon passing effects in which the cladding has an index of refraction less than the core, and the cladding is sensitized to the analyte. When the analyte contacts the cladding, it increases the index of refraction of the cladding above the core to thereby couple the light transmitted in the core to the evanescent wave. The Gergely et al. patent employs its sensor system in a hydrocarbon tank farm, but the cladding is selected to undergo an increase in the index of refraction. Optical time domain reflectometry is used to locate leaks, and both continuous and pulsed light can be employed to sense liquids and vapors having analytes, which will react with the cladding. The Gergely reference detects the leak in the pipeline, but not the location of the leak.

U.S. Pat. No. 5,015,843 to Seitz et al. entitled "Fiber Optic Chemical Sensors Based on Polymer Swelling" is directed to a fiber optic system in which polymer swelling is used to mechanically or physically displace a reflective surface coupled to the fiber optic core and thereby influence light transmission back to the detector. The system requires a relatively high concentration of analyte to be effective, and in order to enhance a sensitivity and minimize this disadvantage, the system preferably is miniaturized.

In addition to leak detection of pipelines, the location of the leak, monitoring and measurement of structural loads, and perturbations in the pipeline are also important.

In some environments, it is necessary or desirable to monitor the location and magnitude of selected loads acting upon a physical structure. For example, it is highly desirable to locate and quantify localized perturbation to which an oil or gas pipeline is subjected, primarily as a result of variations in weather and ground elevation, so that remedial measures can be taken prior to breakage of the pipeline. This problem of pipeline perturbation is particularly troublesome when the pipeline travels through expansive regions of wilderness or wasteland, such as the so-called Alaskan pipeline, which extends for hundreds of miles over relatively unstable tundra.

U.S. Pat. No. 4,421,979 to Asawa et al., entitled "Microbending Of Optical Fibers For Remote Force Measurement" discloses a system for remote measurement of structural forces, including a plurality of microbend transducers mounted along the length of the structure for microbending an optical fiber in response to structural forces. The reference detects the leak in the pipeline, but not the location of the leak.

The prior art has not provided sensors for detecting and exactly locating the position of leaks from tanks, including tanks buried in or resting on the ground, and from pipelines and other vessels using unmodulated continuous-wave (CW) light source. All prior art distributed sensors are used for the localization of the perturbation time or frequency modulated light sources. In general, prior art leak detectors have been unduly complicated, and thus, both expensive and prone to erroneous signals.

Accordingly, there is a need in the art for a system and device for detecting and localizing leaks as soon as the leak occurs, which system and device are comparatively easy to manufacture, inexpensible, and reliable.

The present invention overcomes the problems encountered in the prior art by providing a practical and effective optical fiber sensor for detecting the magnitude and location acting along the length of a structure, such as an oil or gas pipeline, wherein a large number of loss-inducing transducers are capable of being monitored simultaneously from a single remote monitoring station.

SUMMARY OF THE INVENTION

It is therefore a principal object of the present invention to provide a unique fiber optical sensor, which utilizes non-modulated continuous wave light source for detection and localization of the disturbance along the test fiber.

It is an object of the present invention to provide a fiber optic sensor which is easy to install, requires minimum maintenance, is inexpensive to construct, and is easily adjusted.

It is yet another object of the invention to provide a fiber optic sensor to detect the exact location of a leak based upon the unique relation between transmitted and reflected powers for different locations of the disturbance along the test fiber.

It is yet another object of the invention to provide a fiber optic sensor to detect the location of a leak comprising plurality of reflectors and a plurality of loss induced members positioned matching the reflectors.

In view of the foregoing disadvantages inherent in the known types of leak sensors in the prior art, which use a non-modulated continuous wave light source, the present inventor discovered a unique fiber optic sensor, which makes possible not only the detection, but also the localization, of leaks.

The fiber optic sensor in its basic form comprises:

a test fiber having a first port and a second port;

a light source for producing a beam of light propagating along the test fiber;

a fiber optic beamsplitter having a first port connected to the light source, a second port connected to the first port of the test fiber, and a third and a fourth port;

a plurality of reflectors positioned along the test fiber and a plurality of loss-inducing members positioned along the test fiber, wherein said each of the reflectors is matched to each loss-inducing members, wherein at least one reflector is placed between each consecutive loss-inducing members;

an optical reflection detector to receive a constant light flux, the optical reflection detector connected to the third port of optic beamsplitter, wherein the reflection detector is adapted to sense changes in the power of the light reflected from the reflectors;

an optical transmission detector adapted to receive the light flux, connected to the second port of test fiber, said transmission detector being operable to sense changes in the power of the light transmitted through the test fiber; and a transmission/reflection analyzer connected to reflection and transmission detectors, said analyzer adapted to measure the value and identify the location of the disturbance along the test fiber by using an unique relation between transmitted and reflected powers for different locations along the test fiber.

In a first preferred embodiment, the plurality of reflectors comprises a set of lumped (group) reflectors such as fiber Bragg gratings or fiber splices.

In a second preferred embodiment, the plurality of reflectors is continuously distributed inside the test fiber.

In a third preferred embodiment, the plurality of loss-inducing members comprises a plurality of bending members.

In a fourth preferred embodiment, the plurality of loss-inducing members comprises a plurality of waveguide-sensitive members, which change the transmission due to change of its waveguide property.

In a fifth preferred embodiment, the plurality of reflectors comprise a set of selective reflectors each preferentially reflective at a non-overlapping different narrow bandwidth of wavelength inside a measurement wavelength range and the light source having broadband radiation range which exceeds or equals the measurement wavelength range.

In a sixth preferred embodiment, the plurality of bending members includes an absorber/expander mechanically coupled to the test fiber to produce a change in transmission of light along the fiber upon absorption of a chemical agent.

In a seventh preferred embodiment, the transmission/reflection analyzer detects the value and identifies the location of the disturbance along the fiber by using the unique relation between transmitted and reflected powers for different locations of the disturbance along the test fiber for both lasers.

The foregoing has outlined rather broadly the more pertinent and important features of the present invention in order that the detailed description of the invention that follows may be better understood, and so that the present contribution to the art can be more fully appreciated. Additional features of the invention, which will be described hereinafter, will form the subject of the claims of the invention. It should be appreciated by those skilled in the art that the conception and the specific embodiments disclosed may be readily utilized as a basis for modifying or designing other devices and systems for detecting and localizing leakages or for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

Further advantageous embodiments, as well as advantages achieved by means of the invention, will be explained below in greater detail with reference to the drawing, which shows a structure by way of example, and in which:

FIG. 4b shows the dependences between normalized transmitted and reflected power for embodiment of the present invention presented in FIG. 4a.

DETAILED DESCRIPTION OF THE INVENTION

The present invention is based upon the discovery that problems associated with conventional leak monitoring devices can be overcome, production costs can be reduced, and improvements in detection and localization of leaks can be achieved by the use of the fiber optic sensor as described herein.

Light Source

The light source may be of the type selected from the group comprising a laser, tungsten or another type lamp of light, emitting diode (LED), edge-emitting LED (ELED), a superluminescent diode, a superluminescent fiber source, and a fiber Erbium source all known in the art.

Optical Fiber

The optical fiber is a filament of transparent dielectric material, usually glass or plastic, and usually circular in cross section, that guides light. An optical fiber usually has a cylindrical core 120 surrounded by, and in intimate contact with, a cladding 130 of similar geometry.

Bending Member

It has been recognized that relatively short bends in an optical fiber can have a significant effect upon the transmissivity of the fiber core. More specifically, the presence of a short bend having a period on the order of a few millimeters, commonly referred to as a microbend, results in an attenuation of the propagated light signal which arises by scattering of a portion of the signal from the fiber core to the cladding from where most of the scattered light portion is lost ultimately to the surrounding environment.

Microbending is generally distinguished from macrobending by the criterion that in microbending, the transverse displacements of the fiber axis from straightness are generally small compared to the fiber lateral dimensions.

Loss-induced Sensor (Microbending Members)

Microbending members generally involve a mechanical structure such as a serrated plate that presses on the fiber, producing a series of substantial local curvatures (bends). The loss of light is used as a signal to indicate displacement of the mechanical structure.

The invention will now be explained with reference to the figures.

Figure 1:
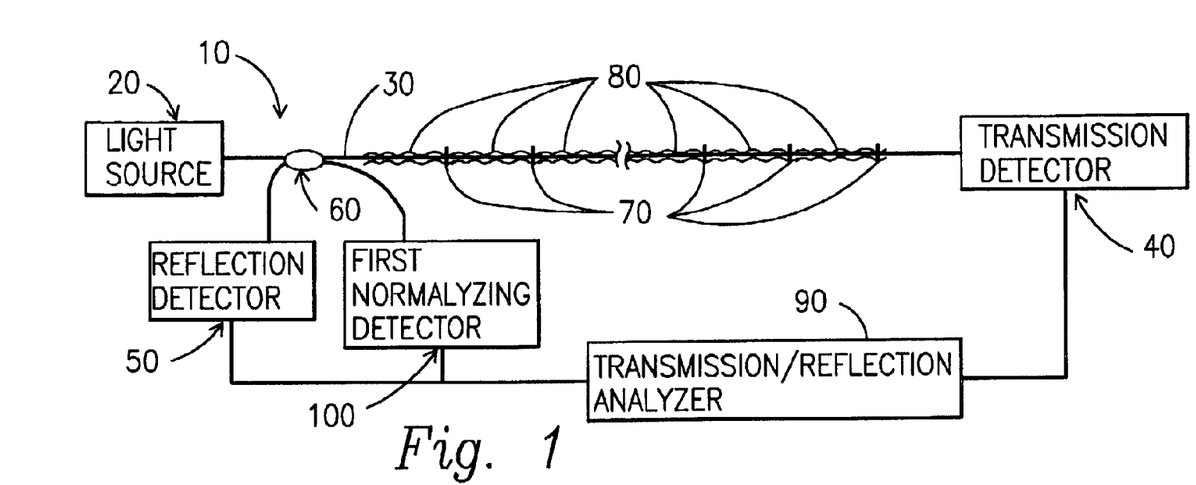
FIG. 1 is a schematic representation illustrating the basic embodiment of a fiber optic sensor with a transmission/reflection analyzer constructed in accordance with the present invention.

Referring to FIG. 1, the present invention comprises a fiber optic sensor 10 which includes a light source 20, that may for example be a LED, a test fiber 30, an optical transmission detector 40, and reflection detectors 50, which may, for example, be a photodiode. The light source 20 is operable to generate a light flux, which is launched into the test fiber 30 through the coupler 60.

The present invention can use standard single or multi-mode fiber as test fiber. The sensor is positioned in a continuous line along the structure to be monitored. The fiber optic sensor can be fixed to the structure by using a steel band or steel tape or adhesive tape, or another known means.

The light propagated along test fiber is partially reflected back by plurality of reflectors 70 positioned along the test fiber and partially scattered out due to the pass through of a plurality of loss-inducing members 80 positioned along the test fiber.

The reflection detector 50 is operable to sense change in the power of the reflected light, and the transmission detector 40 is operable to sense change in the power of the transmitted through test fiber light. Both transmission and reflection detectors electrically connected to transmission/reflection analyzer 90 which is operable to measure the value and identify the location of the disturbance along the test fiber by using unique dependencies between transmitted and reflected powers for different locations of the disturbance along the test fiber.

In order to enhance sensitivity, the measurement of the reflected and transmission light is preferably accomplished by normalizing the power of measured light on input laser power. The first normalizing optical detector 100 is being operable to sense changes in the power of light source in order to avoid the influence of light source power instability.

The present invention is based on the use of the relationship between the change of the reflected and transmitted powers of the light for the determination of the magnitude and position of the disturbance along the test fiber.

The sensor 10 includes a plurality of loss-inducing members 80 characterized by a sensitivity to lateral displacement. Experimentally, it was found that the standard optical fiber changes its transitivity by orders due to micro or macro bending. The value of the excess losses due to micro or macro bending of the fiber can be used for measurement of the value of perturbation. Additionally, in the present invention, relationship between reflected and transmitted powers is used for the localization of the disturbance along the test fiber.

Figure 2:
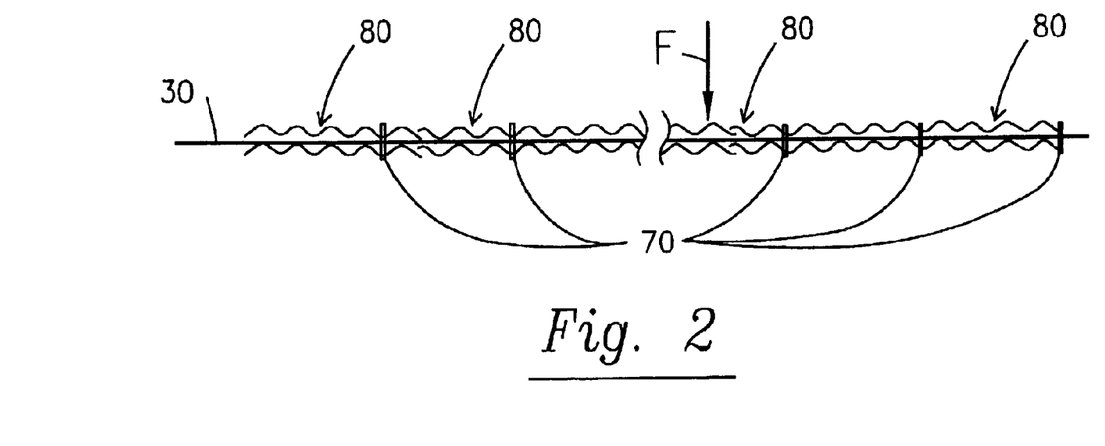
FIG. 2 is a schematic representation of a fiber optic sensor compromising N identical bending members and N Bragg grating reflectors preferentially reflecting a light at a non-overlapping narrow bandwidth of wavelength.

FIG. 2 presents the fiber optic sensor having N identical loss-inducing members 80 and N reflectors 70 which are placed, except the last one, between the loss-inducing members 80.

The reflectors are performed as fiber optic Bragg gratings with equal peak reflectivity, but different Bragg wavelength. Each grating preferentially reflects a light at a non-overlapping narrow bandwidth of wavelength inside a measurement wavelength range (see FIG. 3a).

The reflectors are physically spaced from each other by a predetermined distance X along the sensor, and each has a unique wavelength component that is separated from each other from about a fraction of a nanometer to even greater than a nanometer. The distance X is dependent upon the number of sensor elements (A, B, C . . . N) to be used and the total distance on the equipment or material being monitored that the sensor is to cover.

Figure 3A:
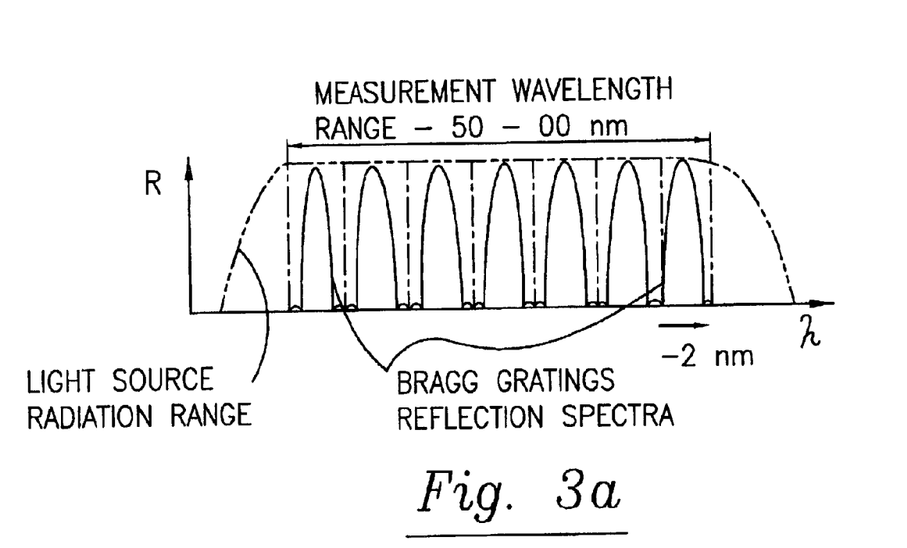
FIG. 3a shows reflection spectra of Bragg gratings and spectrum of light source for embodiment of the present invention presented in FIG. 2.

The light source having broadband radiation range, which exceeds or equals to said measurement wavelength range and having approximately the same spectral power inside the measurement wavelength range (See FIG. 3a). Transmission and reflection detectors are being operable to sense changes in the power of the transmitted and reflected light in total measurement wavelength range.

Let power of the transmitted through the test fiber light decreasing on T% due to induced additional losses (FIG. 2). As well known, the value of this decrease can be used for measurement of the disturbance value. But, if we also take into account the value of decrease of reflected light power, we can localize the influence. Indeed, if a decrease of transmitted power on T% is accompanied by the same decrease on T% of the reflected power it means that perturbation affects the first bending member, because only in this case, the value of decrease of the transmitted power can be equal to the value of decrease of the reflected power. Further, if the decrease of the transmitted light power on T% accompanied by the decrease of the reflected light power on T% (N−1)/N it certainly means, that the disturbance affects the second bending member.

Broadly, for the localization of the perturbation, the transmission/reflection analyzer 90 can operate under the following algorithm:

The relation between decreases of the powers of the transmitted and reflected light is defined by $$X = T(N-k+1)/N \quad (1)$$

Where N is a number of lumped reflectors,

T is the decrease in percent of the transmitted power

K is the integer, which is defined by the position of the perturbation along the test fiber.

Actually, k is the number of the loss-inducing member where disturbance takes place. Using relation (1), we can find the number k, and therefore to localize influence if we know the values of decreases of transmitted and reflected powers.

With transmission/reflection analyzer 90 operating under algorithm (1), the position of the perturbation along the test fiber can be found without any time or frequency or spectral-domain analysis, using only transmitted and reflected power of the unmodulated continuous-wave light.

Figure 3B:
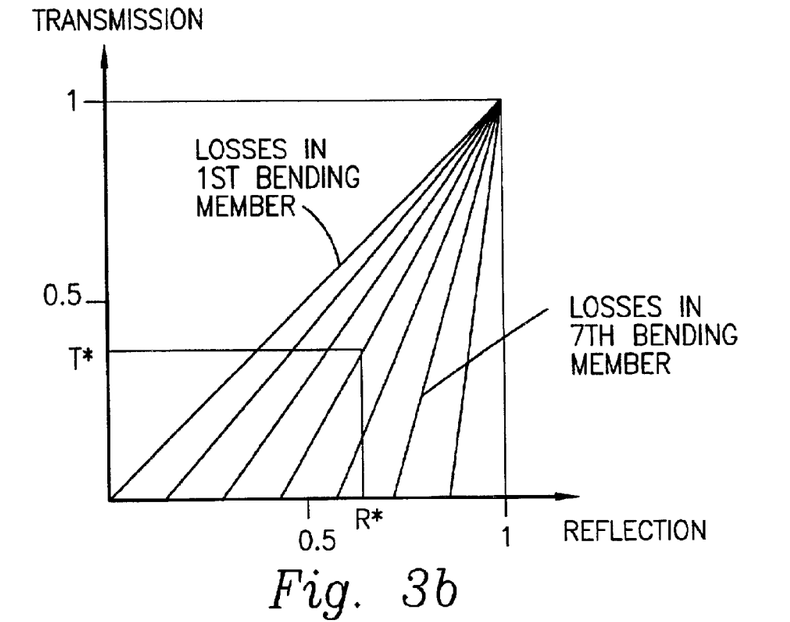
FIG. 3b shows the dependences between normalized transmitted and reflected power for embodiment of the present invention presented in FIG. 2.

FIG. 3b shows the dependences between normalized transmitted and reflected powers when additional losses occur in different bending members. Transmitted and reflected powers were normalized on its initial undisturbed values. A calculation was performed for 7 bending members and 7 Bragg gratings. As it follows from the data presented at FIG. 4b, we can clearly recognize the number of bending members, where the excess losses occur if we know the normalized reflected and transmitted power. For example, if normalized transmitted and reflected powers are equal to T* and R* respectively, we can conclude that perturbation affects fourth bending member, because the measured point (R*, T*) is placed nearly to the dependence for fourth bending member (see FIG. 3b).

Therefore, the present invention measures the value of the disturbance using the change of transmitted power and localizes the perturbation using the unique dependence between normalized transmitted and reflected powers for certain bending members, which are disturbed.

Note that with basic embodiments of the present invention, only one perturbation along the test fiber can be measured and localized.

Figure 4A:
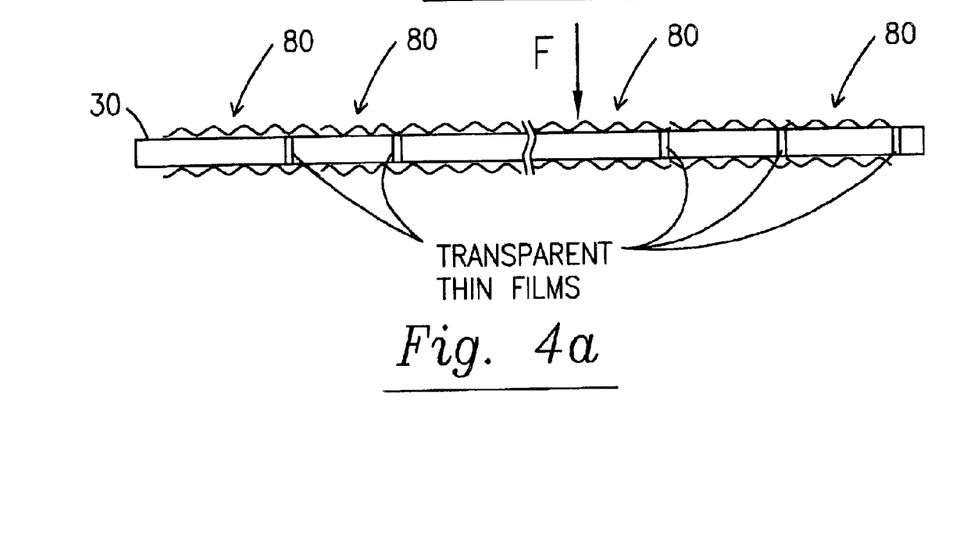
FIG. 4a is a schematic representation of a fiber optic sensor compromising N identical bending members and N identical reflectors.

FIG. 4a shows the first embodiment of the invention. The plurality of reflectors comprises identical lumped reflectors 110 that reflect the light exactly at the same spectral interval. The plurality of reflectors can comprise, for example, a plurality of fiber splices with the equal reflectivity. Equal reflectivity of splicers can be provided by using thin films placed between surfaces of two fibers. By choosing appropriate refractive indexes of thin film, the reflectivity of splices can be made about 1% or less. To avoid the coherence effects, the light source, with the coherence length less than the distance between reflectors, can be used.

Figure 4B:
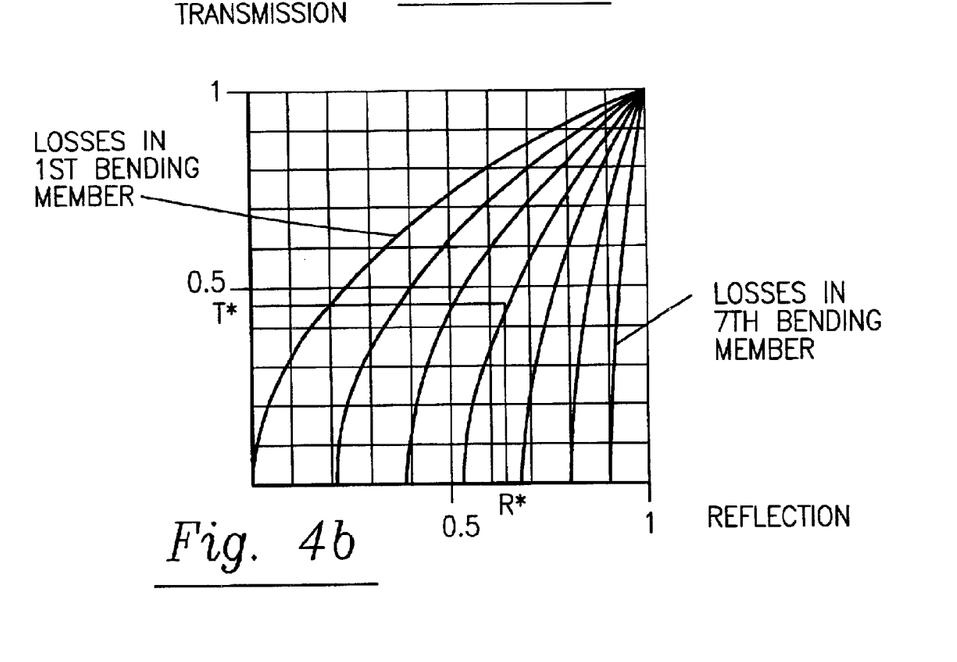

The present invention allows locating the perturbation when equal lumped reflectors are used. FIG. 4b shows the result of numerical calculation of the dependences between normalized transmitted and reflected powers for identical lumped reflectors when additional bending losses occur at different loss-inducing members. To determinate the transmitted and reflected power, an algorithm was used. The algorithm successively calculates the transmission and reflection of a series of mirrors and loss fiber segments. The algorithm was designed to take into account multiple re-reflections in case of utilizing highly reflective mirrors or Bragg gratings. The simulation was performed for the reflectivity of lumped reflectors equal to 8% for 7 reflectors. Using the data presented in FIG. 4b, the nearest to the measured point (characterized by normalized reflection equal to R*, and normalized transmission equal to T*) dependence can be defined and therefore, the number of bending members, where the excess losses occur can be recognized.

So, even for identical reflectors, the position of the perturbation along the test fiber can be found by using the relation between transmitted and reflected power of the unmodulated continuous-wave light.

The first embodiment of the present invention can localize the perturbation with a spatial resolution that is determined by the distance between two neighboring lumped reflectors 70. To increase the resolution, the number of lumped reflectors, and, therefore, the number of loss-induced members should be increased.

In a second preferred embodiment, the plurality of reflectors is continuously distributed inside the test fiber.

In a third preferred embodiment, the plurality of loss-inducing members comprises a plurality of bending members.

In a fourth preferred embodiment, the plurality of loss-inducing members comprises a plurality of waveguide-sensitive sensors, which change the transmission due to change of its waveguide property.

In a fifth preferred embodiment, the plurality of reflectors comprise a set of selective reflectors each preferentially reflective at a non-overlapping different narrow bandwidth of wavelength inside a measurement wavelength range and the light source having broadband radiation range which exceeds or equals the measurement wavelength range.

Figure 5:
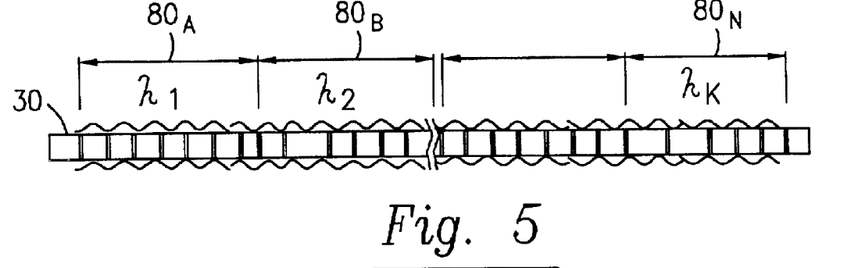
FIG. 5 is a schematic representation of a fiber optic sensor where each selective reflector from the set of selective reflectors comprises a series of N consequently placed along the test fiber identical reflectors.

In order to increase the number of sensitive or loss-induced members, "K" series of "N" identical selective reflectors were used. FIG. 5 presents the third embodiment of the current invention where each selective reflector from said set of selective reflectors comprises a series of "N" consequently placed along the test fiber identical reflectors. The plurality of reflectors can be performed as a set of series of weak Bragg gratings with the peak reflectivity about 1%. Each series comprises "N" identical Bragg gratings with the same Bragg wavelength, but gratings from different series have different Bragg wavelengths. The light source should have broadband radiation range, which exceeds or equals the measurement wavelength range, or tunable laser can be used. The reflected light is analyzed by a spectro-analyzer. This embodiment of invention allows increasing the number of loss-induced members by using additional spectral channels. Decreasing of the reflected light power at certain spectral intervals gives the position of perturbation with accuracy equal to the length of the one series interval. Further localization inside the series-length-interval can be made such as described above.

Figure 6:
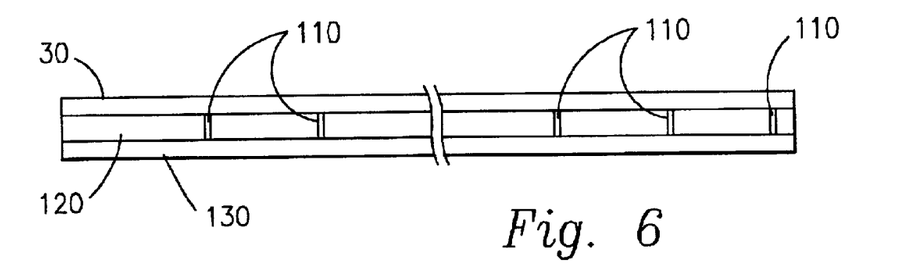
FIG. 6 is a schematic representation of a fiber optic sensor, which uses the change of the light-guiding properties of the fiber.
Figure 7:
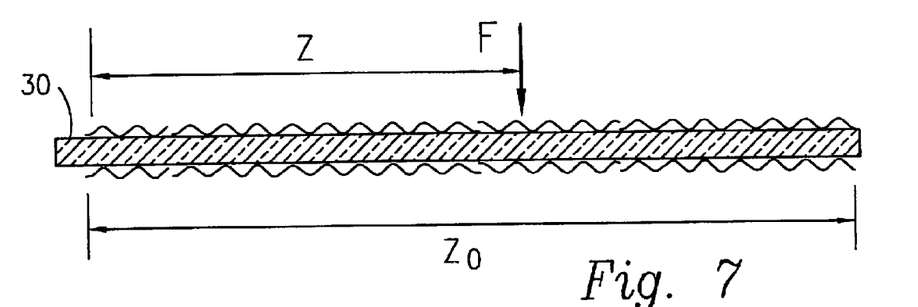
FIG. 7 is a schematic representation of a fiber optic sensor comprising bending member and distributed reflectors.

The sensor shown in FIG. 2 is designed to utilize the well-known phenomenon of bend-induced losses to indicate the strain. Another way to achieve additional losses under external perturbation is to use the change of the light-guiding properties of the fiber. Commercially available polymer-clad silica fiber which is coated with silicone polymer cladding 130 over its entire length with lumped reflectors 110 positioned along the test fiber (FIG. 6) can be used as such system.

The silicone polymer cladding is intrinsically sensitive to non-polar chemicals. These chemicals diffuse into the polymer cladding to introduce the intrinsic absorption of the fiber material. It causes the additional absorption losses of the light, which propagate through the fiber because the light-guiding properties of the fiber are affected through the evanescent field by chemical substances enriched in the polymer cladding.

The present invention allows the use of reflectors, which are continuously distributed inside the test fiber. Even Rayleigh scattering on small non-uniformity in glass composition of standard communication optical fiber can be used in the present invention.

Figure 8:
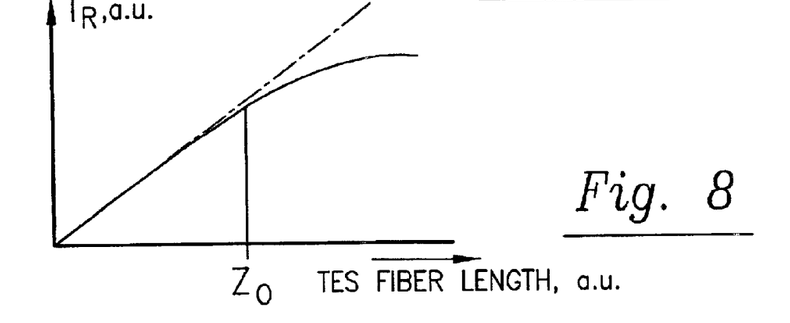
FIG. 8 shows the dependence of the power of the reflected light on test fiber length for embodiment of the present invention presented in FIG. 7.

If transmitted through undisturbed test fiber power decreases not significantly, the reflected (or Rayleigh backscattered) power $I_R$ increases proportionally to the length of the test fiber (FIG. 8). In this case, if the transmitted power decreases on T% due to induced external losses at distance z, the power of the reflected light should decrease on value X%.

$$X = T(1 - z/Z_0) \qquad (2)$$

where z is the distance where the losses take place and $Z_0$ is the test fiber length.

Commonly speaking, this expression is similar to the expression for lumped detectors (1), but instead, the number of sensors "k", where perturbation takes place; the current length z was used. So, with the present invention, the perturbation can be localized even for continuously distributed reflectors if transmission/reflection analyzer 90 operates under the algorithm based on expression (2).

Figure 9:
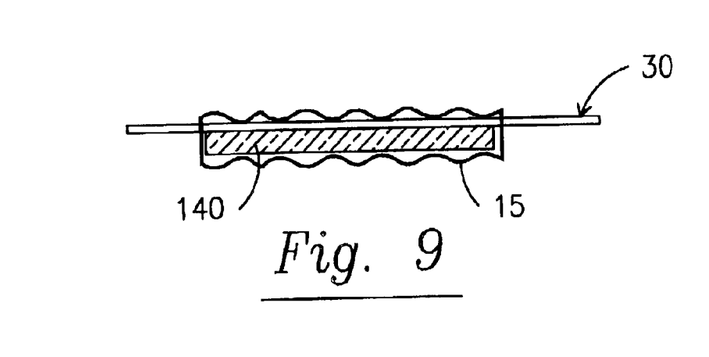
FIG. 9 is a front elevation view of a sensitive element of the chemical sensor.

In the sixth preferred embodiment of the present invention, the plurality of bending members 80 include an absorber/expander element 140 mechanically coupled to the test fiber 30. The absorber/expander element bends the test fiber upon absorption of a chemical agent that produces a change in transmission and reflectivity of light along the fiber. When sensor 10 is to be used to sense the presence of hydrocarbons or its vapors, absorber/expander elements may be made from white rubber or red silicone rubber.

Absorber/Expander

The material selected for the sensor absorber/expander element should exhibit a unique coefficient of expansion for liquid and vapor hydrocarbons, resist the water, and provide good reversibility under multiple dry-wet cycles.

As non-limiting examples of polymers which may be used as the absorber/expander, mention may be made of synthetic rubbers, silicone rubber, Tygon R (manufactured by Celanese Mexicana), polyvinyl chloride, polymethyl methacrylate, polybutadiene, polytetrafluoroethylene. Preferred among these are silicone, polybutadiene, and polytetrafluoroethylene.

The absorber/expander member is mechanically coupled to the fiber optic in a manner that produces a decrease in light power transmitted along the strand, for example by microbending of the strand upon expansion of the silicone rubber member or axial misalignment of strand portions.

Figure 10:
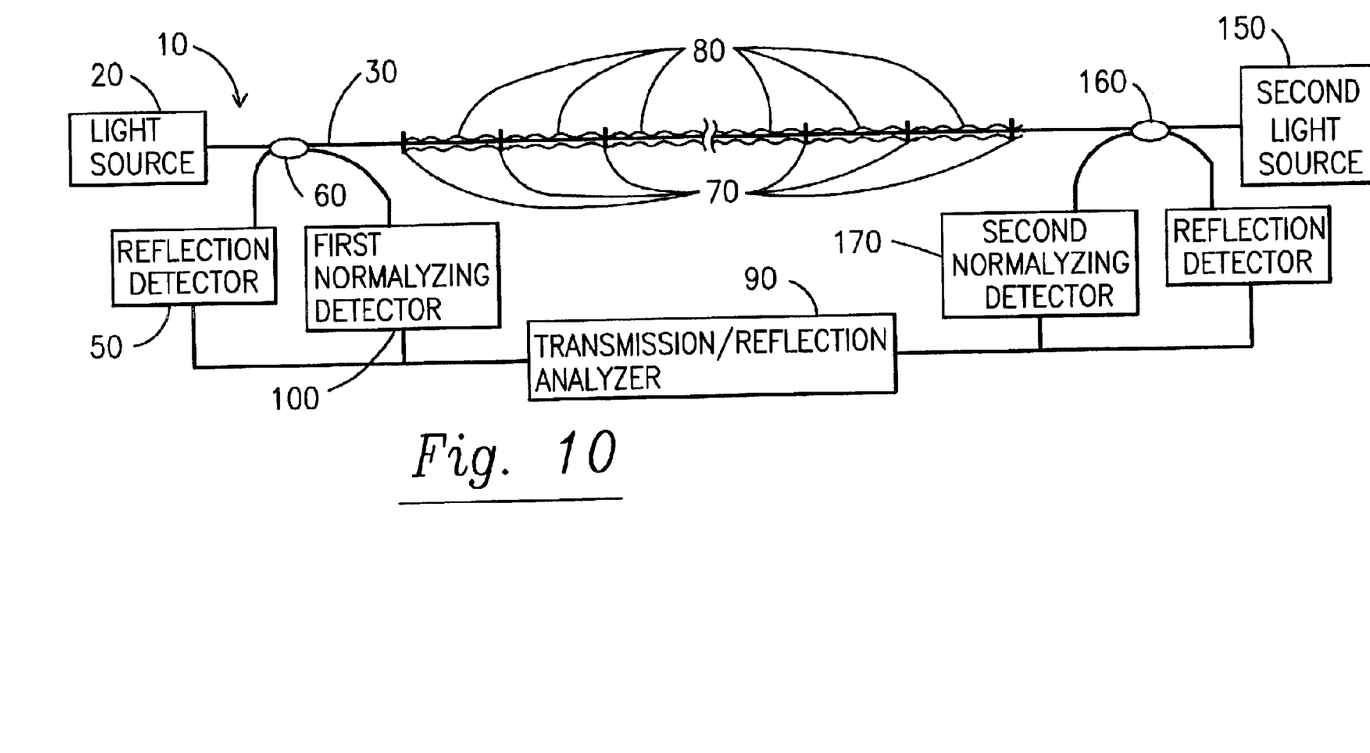
FIG. 10 is an extended embodiment of the invention and additionally comprises a second light source, second fiber optic beamsplitter, and second normalizing detector.

An expanded embodiment of the invention is shown in FIG. 10 and includes the same components of the basic embodiment of the present invention and additionally comprises a second light source 150 which is connected to output of said test fiber through a second fiber optic beamsplitter 160. Second light source 150 is operable to generate a light flux, which is launched into the test fiber 30 through the coupler 160. Second normalizing optical detector 170 is connected to fourth ports of additional fiber optic beamsplitter, said detector being operable to sense changes in the power of additional light source in order to avoid the influence of additional light source power instability.

Actually, the configuration shown in FIG. 10 provides the possibility for two independent measurements of one perturbation that allows increasing the accuracy of the measurement. Moreover, this embodiment also allows for the localization of two strong disturbances simultaneously.

The fiber optic sensor of the present invention can also be used for the detection of organic substances leaks, water leaks, and in the medical field, to detect leaks in dialysis apparatus.

The fiber optic sensor of the present invention offers two great advantages over other detection systems; (a) the location of the leak can be pinpointed easily and precisely by using non-modulated continuous wave light source; and (b) it is relatively inexpensive.

Although this invention has been described in its preferred form with a certain degree of particularity with respect to the detection of hydrocarbon leaks, it should be understood that the present disclosure of the preferred form has been made only by way of example, and that numerous changes in the details of structures and the steps of process may be resorted to without departing from the spirit and scope of the invention.

Now that the invention has been described,
What is claimed is:
1. A fiber optic sensor, comprising:
a test fiber having a first port and a second port;
a non-modulated non coherent light source for producing a beam of light propagating along the test fiber;
a fiber optic beamsplitter having a first port connected to the light source, a second port connected to the first port of the test fiber, and a third and a fourth port;
a plurality of reflectors positioned along the test fiber and a plurality of loss-inducing members positioned along the test fiber, wherein said each of the reflectors is matched to each loss-inducing members, wherein at least one reflector is placed between each consecutive loss-inducing members;
an optical reflection detector for detecting a light flux, the optical reflection detector connected to the third port of the fiber optic beamsplitter, wherein the reflection detector is adapted to sense changes in the average power of the light reflected from the reflectors;
an optical transmission detector adapted to receive the light fluxes, connected to the second port of the test fiber, said transmission detector being operable to sense changes in the average power of the light transmitted through the test fiber; and a transmission/reflection analyzer connected to reflection and transmission detectors, said analyzer adapted to measure the value and identify the location of a loss-inducing disturbance along the test fiber by using an unique relation between transmitted and reflected average powers for different locations of the disturbance along the test fiber.

2. The fiber optic sensor according to claim 1, wherein said plurality of reflectors comprises a set of lumped reflectors selected from the group consisting of fiber Bragg gratings and fiber splices.

3. The fiber optic sensor according to claim 1, wherein, said plurality of reflectors are continuously distributed inside the test fiber.

4. The fiber optic sensor according to claim 1, wherein said plurality of loss-induced members are continuously distributed along the test fiber.

5. The fiber optic sensor according to claim 1, wherein said plurality of loss-inducing members comprises a plurality of bending members.

6. The fiber optic sensor according to claim 1, wherein said plurality of loss-inducing members comprises a plurality of waveguide-sensitive members.

7. The fiber optic sensor according to claim 1, further including a second light source connected to the second port of said test fiber through a second fiber optic beamsplitter, the second beamsplitter having a first port connected to said second light source, a second port connected to the second port of said test fiber, a third port connected to said optical transmission detector and a fourth port.

8. The fiber optic sensor according to claim 1, wherein a first normalizing optical detector is connected to the fourth port of the fiber optic beamsplitter, said detector adapted to sense changes in the average power of the light source in order to avoid the influence of a light source power instability.

9. A fiber optic sensor, comprising:
   a test fiber having a first port and a second port;
   a non-modulated non coherent light source for producing a beam of light propagating along the test fiber;
   a fiber optic beamsplitter having a first port connected to the light source, a second port connected to the first port of the test fiber, and a third and a fourth port;
   a plurality of reflectors positioned along the test fiber and a plurality of loss-inducing members positioned along the test fiber, wherein said each of the reflectors is matched to each loss-inducing members, wherein at least one reflector is placed between each consecutive loss-inducing members;
   an optical reflection detector for detecting a light flux, the optical reflection detector connected to the third port of the fiber optic beamsplitter, wherein the reflection detector is adapted to sense changes in the average power of the light reflected from the reflectors;
   an optical transmission detector adapted to receive the light fluxes, connected to the second port of the test fiber, said transmission detector being operable to sense changes in the average power of the light transmitted through the test fiber;
   a transmission/reflection analyzer connected to reflection and transmission detectors, said analyzer adapted to measure the value and identify the location of a loss-inducing disturbance along the test fiber by using an unique relation between transmitted and reflected average powers for different locations of the disturbance along the test fiber;
   wherein said plurality of reflectors comprises a set of lumped reflectors selected from the group consisting of fiber Bragg gratings and fiber splices; and
   wherein said plurality of reflectors comprise a set of selective reflectors, each reflective at a non-overlapping different narrow bandwidth of wavelength inside a measurement wavelength range, and said light source having broadband radiation range which exceeds or equals to said measurement wavelength range.

10. The fiber optic sensor according to claim 5, wherein, said plurality of bending members includes an absorber/expander mechanically coupled to the test fiber to produce a change in transmission of light along the fiber upon absorption of a chemical agent.

11. The fiber optic sensor according to claim 7, wherein said transmission/reflection analyzer detects the value and identifies the location of the disturbance along the fiber by using an unique relation between transmitted and reflected average powers for different locations of the disturbance along the test fiber for both light sources.

12. A fiber optic sensor, comprising:
   a test fiber having a first port and a second port;
   a non-modulated non coherent light source light for producing a beam of light propagating along the test fiber;
   a fiber optic beamsplitter having a first port connected to the light source, a second port connected to the first port of the test fiber, and a third and a fourth port;
   a plurality of reflectors positioned along the test fiber and a plurality of loss-inducing members positioned along the test fiber, wherein said each of the reflectors is matched to each loss-inducing members, wherein at least one reflector is placed between each consecutive loss-inducing members;
   an optical reflection detector for detecting a light flux, the optical reflection detector connected to the third port of the fiber optic beamsplitter, wherein the reflection detector is adapted to sense changes in the average power of the light reflected from the reflectors;
   an optical transmission detector adapted to receive the light fluxes, connected to the second port of the test fiber, said transmission detector being operable to sense changes in the average power of the light transmitted through the test fiber;
   a transmission/reflection analyzer connected to reflection and transmission detectors, said analyzer adapted to measure the value and identify the location of a loss-inducing disturbance along the test fiber by using an unique relation between transmitted and reflected average powers for different locations of the disturbance along the test fiber; and
   a second light source connected to the second port of said test fiber through a second fiber optic beamsplitter, the second beamsplitter having a first port connected to said second light source, a second port connected to the second port of said test fiber, a third port connected to said optical transmission detector and a fourth port;
   wherein a second normalizing optical detector is connected to the fourth port of said second fiber optic beamsplitter, said detector being adapted to sense changes in the average power of the second light source in order to avoid the influence of a second light source power instability.

13. The fiber optic sensor according to claim 9, wherein each selective reflectors from said set of selective reflectors comprises a series of "N" consequently placed along the test fiber identical reflectors and said reflection detector is a spectroanalyzer.

14. A method for calculating the value and location of a disturbance in a system, the method comprising the steps of:

A) positioning an optical fiber sensor along the system to be monitored;

wherein the optical fiber sensor comprises:

a test fiber having a first port and a second port;

a non-modulated non coherent light source for producing a beam of light propagating along the test fiber;

a fiber optic beamsplitter having a first port connected to the light source, a second port connected to the first port of the test fiber, and a third and a fourth port;

a plurality of reflectors positioned along the test fiber and a plurality of loss inducing members positioned along the test fiber, wherein each of the reflectors is matched to each of the loss-inducing members, wherein at least one reflector is placed between each consecutive loss-inducing members;

an optical reflection detector for detecting a light flux, the optical reflection detector connected to the third port of the fiber optic beamsplitter, wherein the reflection detector is adapted to sense changes in the average power of the light reflected from the reflectors;

an optical transmission detector adapted to receive the light fluxes, connected to the second port of the test fiber, said transmission detector being operable to sense changes in the average power of the light transmitted through the test fiber; and a transmission/reflection analyzer connected to reflection and transmission detectors, said analyzer adapted to measure the value and identify the location of a loss-inducing disturbance along the test fiber by using an unique relation between transmitted and reflected average powers for different locations of the disturbance along the test fiber B) detecting a change in light transmission and reflection in said test fiber; and C) calculating the value and location of the disturbance by using an unique relation between transmitted and reflected average powers for different locations of the disturbance along the test fiber.

* * * * *